Figure 1:
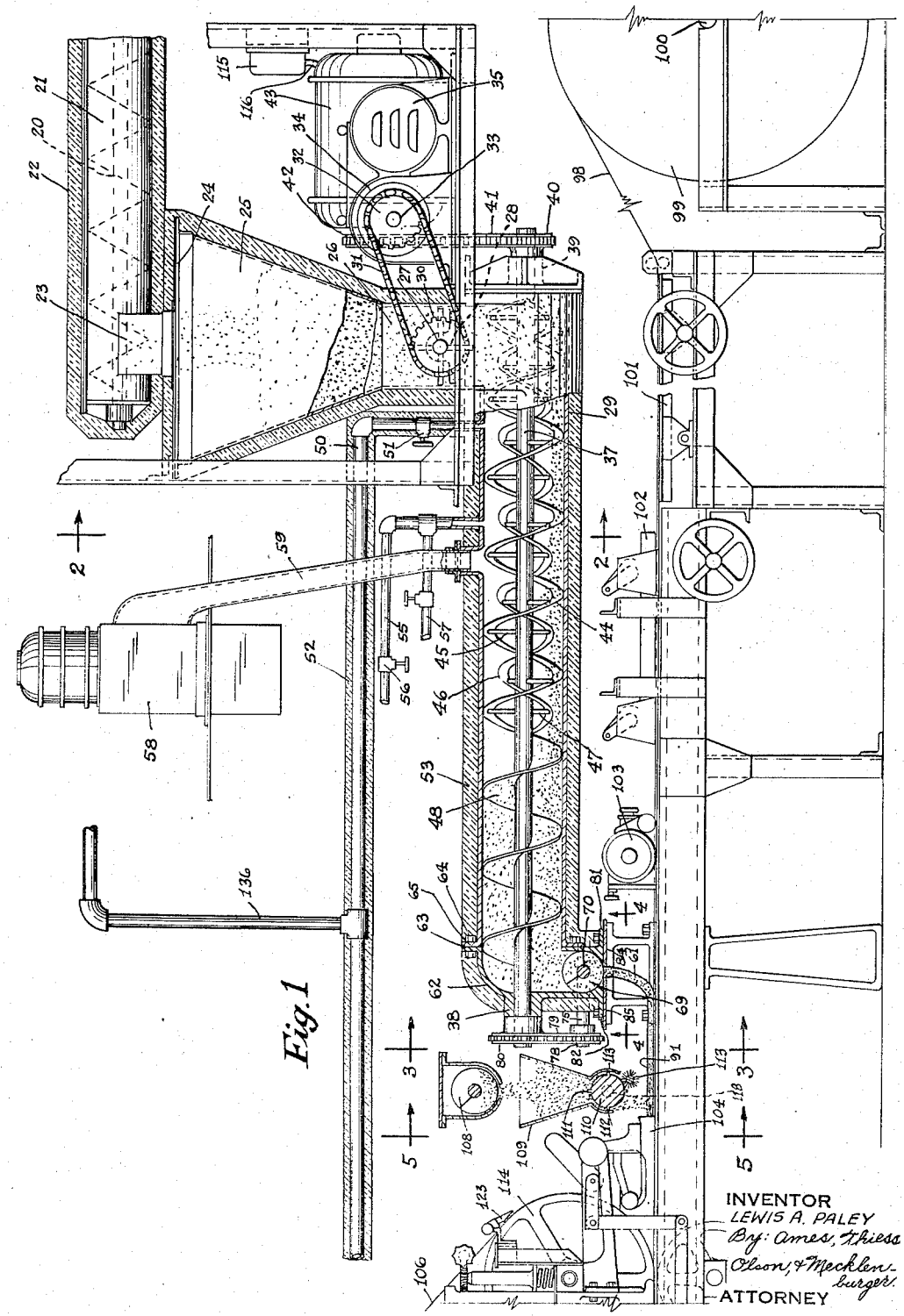

Jan. 2, 1945.  L. A. PALEY  2,366,673
METHOD OF PREPARING GYPSUM CASTS
Filed Dec. 30, 1939    6 Sheets-Sheet 1

INVENTOR
LEWIS A. PALEY
By: Ames, Thiess
Olson, & Mecklenburger
ATTORNEY

Jan. 2, 1945.  L. A. PALEY  2,366,673
METHOD OF PREPARING GYPSUM CASTS
Filed Dec. 30, 1939  6 Sheets-Sheet 2

INVENTOR
LEWIS A. PALEY
BY Ames, Thiess,
Olson, & Mecklenburger.
ATTORNEY

Jan. 2, 1945.  L. A. PALEY  2,366,673
METHOD OF PREPARING GYPSUM CASTS
Filed Dec. 30, 1939  6 Sheets-Sheet 3
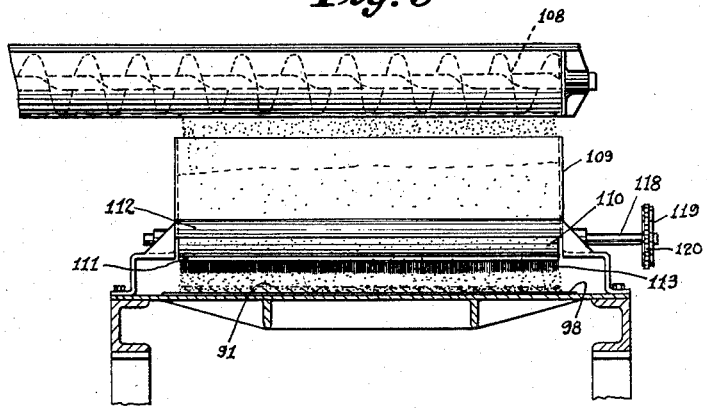
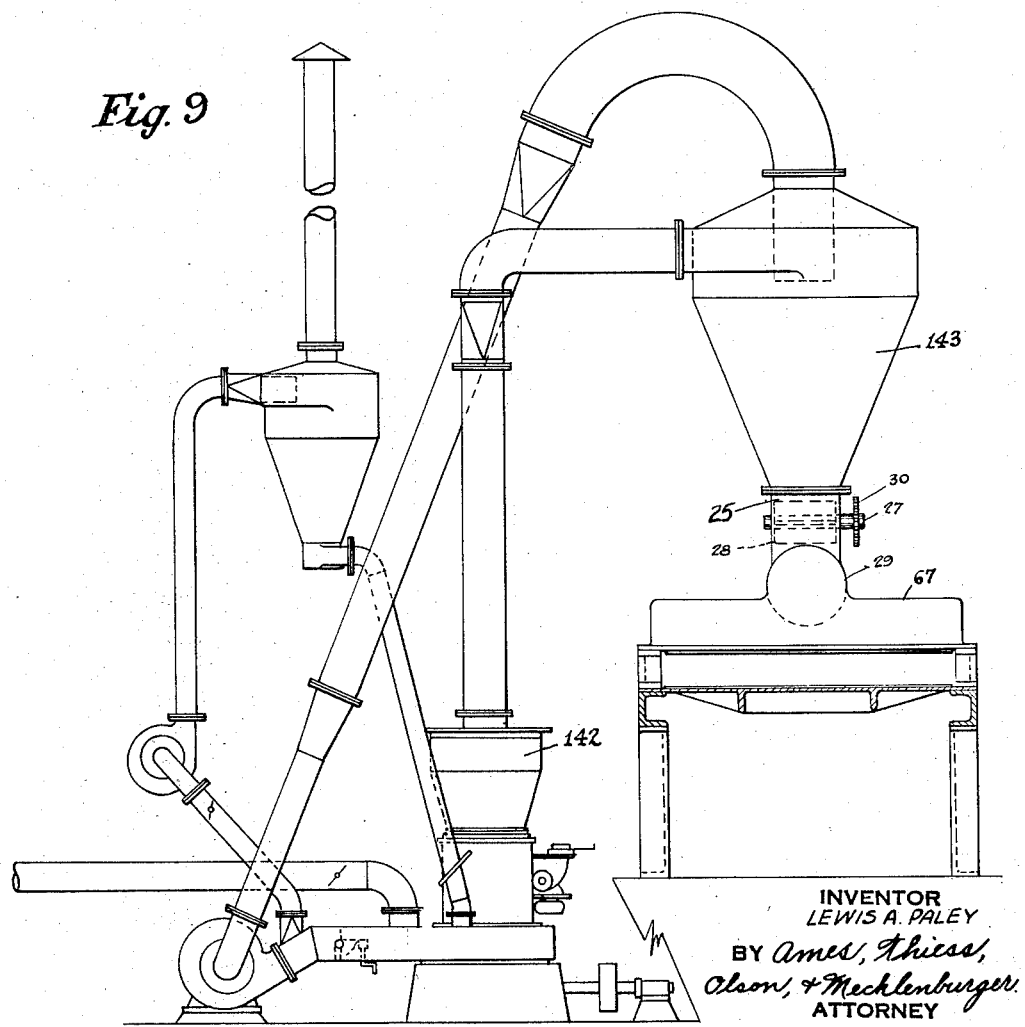
INVENTOR
LEWIS A. PALEY
BY Ames, Thiess,
Olson, & Mechlenburger
ATTORNEY

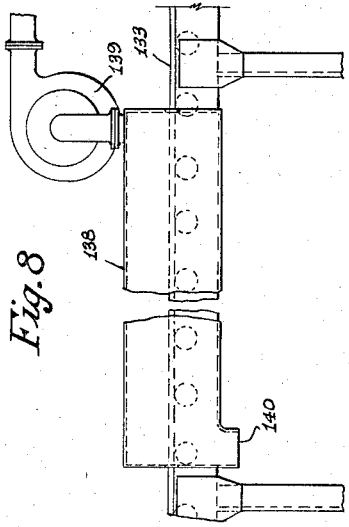
Fig. 8
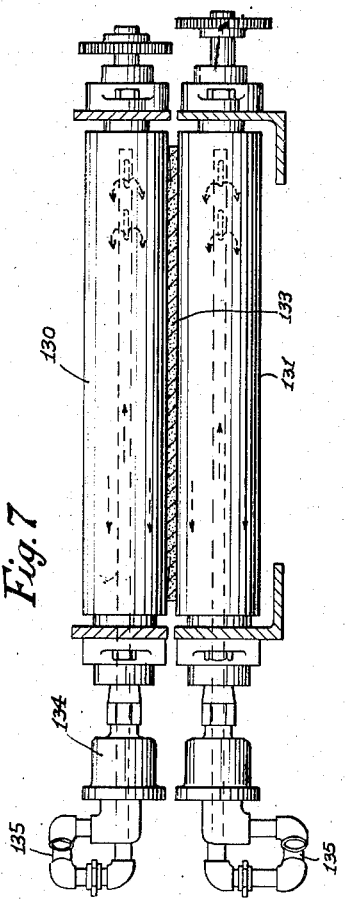
Fig. 7
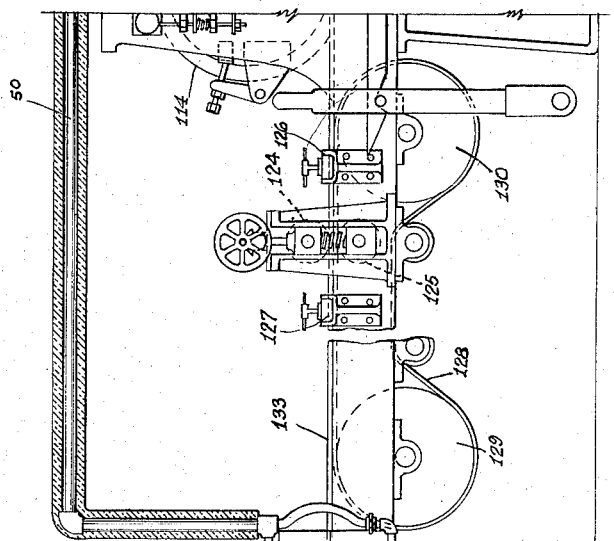
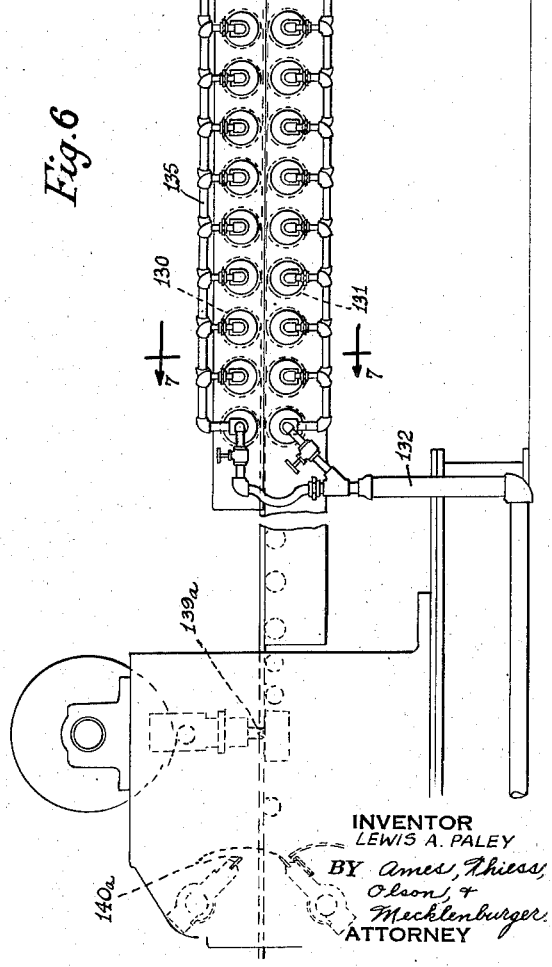
Fig. 6

Jan. 2, 1945.　　　　　L. A. PALEY　　　　　2,366,673
METHOD OF PREPARING GYPSUM CASTS
Filed Dec. 30, 1939　　　6 Sheets-Sheet 5
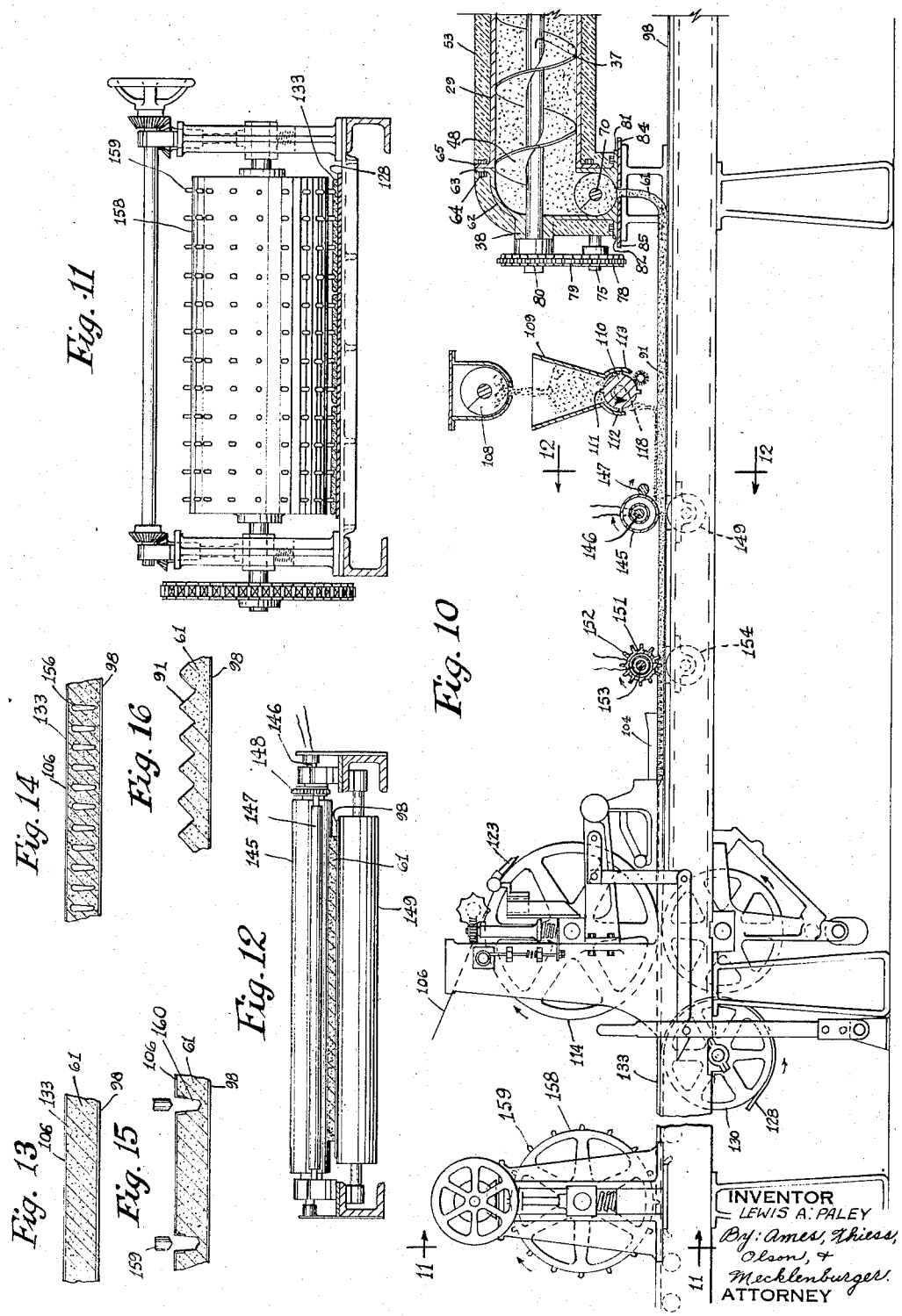
INVENTOR
LEWIS A. PALEY
By: Ames, Thiess, Olson, & Mecklenburger
ATTORNEY Patented Jan. 2, 1945

2,366,673

UNITED STATES PATENT OFFICE 2,366,673

METHOD OF PREPARING GYPSUM CASTS

Lewis A. Paley, Bloomingdale, Ill., assignor to United States Gypsum Company, Chicago, Ill., a corporation of Illinois Application December 30, 1939, Serial No. 311,771

15 Claims. (Cl. 154—1)

This invention relates to the manufacture of gypsum casts, such as boards, blocks and other articles of irregular shape.

The invention further relates to the method of manufacturing said casts and to an apparatus suitable for carrying out the method.

In the manufacture of gypsum board or blocks, it is customary to mix a slurry of calcined gypsum, fiber and about 80% of water. This slurry is very fluid and considerable splashing occurs when the slurry falls from the mixer to the bottom moving strip of paper forming a board facing sheet. A stable foam is also usually added to the slurry in the mixer to produce a low density in the resulting porous board core. About 15% of the 80% of water in the slurry combines chemically with the calcined gypsum to form the dihydrate, and the balance of 65% of free or uncombined water must be eliminated by an expensive drying process. It has been found that the core of the board produced through the use of this excess of water in the slurry is comparatively low in strength, is soft and is very fragile. The slurry of calcined gypsum is generally mixed at room temperature and due to the quick setting property of the gypsum, hydrated gypsum tends to set in the mixer and build up on the inner surfaces of the mixer or to form lumps which contaminate the board core and cause erratic setting time of the gypsum.

It has been found that by materially reducing the quantity of water in the slurry, the board core, blocks, or other gypsum casts, are considerably increased in strength and hardness. By the use of thicker mixes containing a lower percentage of water, all splashing of the slurry is eliminated. Furthermore, by the use of elevated temperatures in the slurry, all tendency of the gypsum to set on the mixer surfaces is eliminated. The thick slurry in the form of a plastic of mortar consistency may be extruded in the form of a ribbon of approximately the shape of the finished board core. When operating at room temperature, the extrusion of a plastic gypsum ribbon from an elongated orifice would be impossible due to setting up of the gypsum. The ribbon of plastic gypsum may be provided with one or both surfaces longitudinally corrugated by providing a serrated edge or edges on the boundary of the extrusion orifice. Powdered calcined gypsum may be uniformly applied to this corrugated ribbon surface to absorb additional free moisture from the board core so as to greatly reduce or completely eliminate the drying process, thus effecting substantial savings in manufacturing costs. Due to the rapid change in viscosity of the plastic gypsum slurry with change in percentage of water, the power input into the mixer can be used as a measure of water content of the slurry, thus enabling an operator to maintain a uniform percentage of water in the slurry. Due to the plastic nature of the gypsum ribbon, voids may be mechanically formed in the ribbon by a spiked rotor or other means, so that the core of the board is provided with mechanically formed voids to reduce the weight of said boards and improve their thermal insulation value. A stable foam may be mixed with these thick slurries to reduce the density of the resulting cast. Porous aggregates, such as vermiculite, slag, or pumice, may also be incorporated in the thick slurries to reduce density; or gas generating agents, such as limestone and alum, may be used for the same purpose.

An object of the invention therefore is to produce a gypsum board or other molded object, having a strong and hard core obtained by the use of a low percentage of water in the mix.

Another object of the invention is to produce a calcined gypsum slurry having a low percentage of water, and to extrude said slurry as a ribbon.

Another object of the invention is to maintain said thick, plastic slurry at an elevated temperature to permit the extrusion thereof without setting.

Another object of the invention is to corrugate or otherwise deform one or more surfaces of said ribbon of gypsum and to apply powdered calcined gypsum to said corrugated surface for the purpose of absorbing excess moisture and reducing or eliminating drying costs.

A further object of the invention is to produce a gypsum board or cast having internal voids obtained by perforating mechanically a thick gypsum ribbon prior to the application of a fibrous cover sheet.

A still further object of the invention is to provide a mixing apparatus for producing thick gypsum slurries in which the water content of the slurry may be measured and controlled by measuring the power input into said mixer; also to improve gypsum casts and their methods of and apparatus for producing same in other respects hereinafter specified and claimed.

Figure 2:
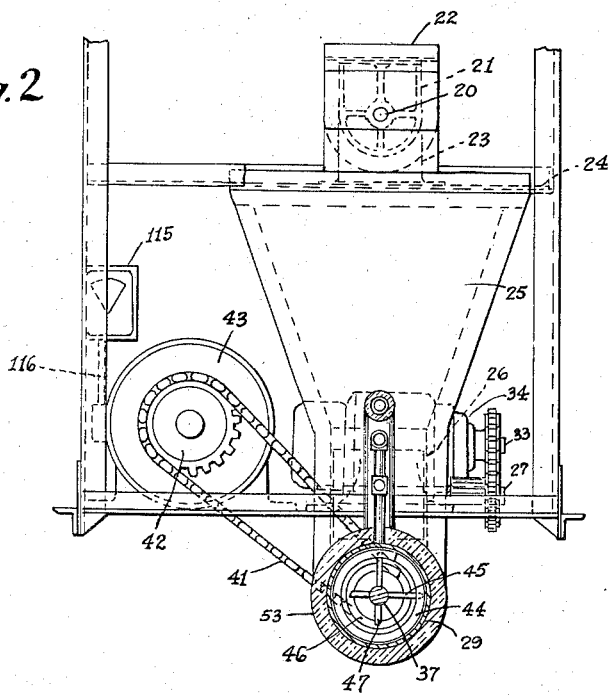
Figure 3:
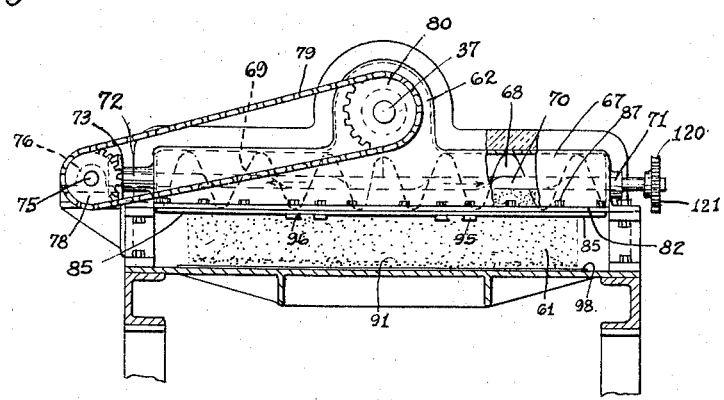

Reference is to be had to the accompanying drawings forming a part of this specification, in which Fig. 1 is a sectional elevation through the feed end of a board machine showing my improved mixing apparatus, Fig. 2 is a transverse sectional view through the mixer taken on line 2—2 of Fig. 1, Fig. 3 is a transverse sectional elevation through the mixer taken on line 3—3 of Fig. 1, with a portion of the insulation removed and with a part of the conveyor housing broken away.

Figure 4:
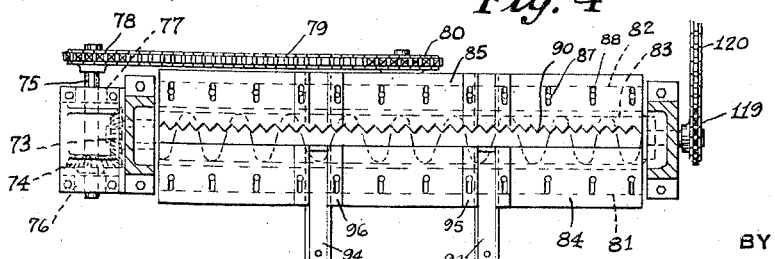
Figure 17:
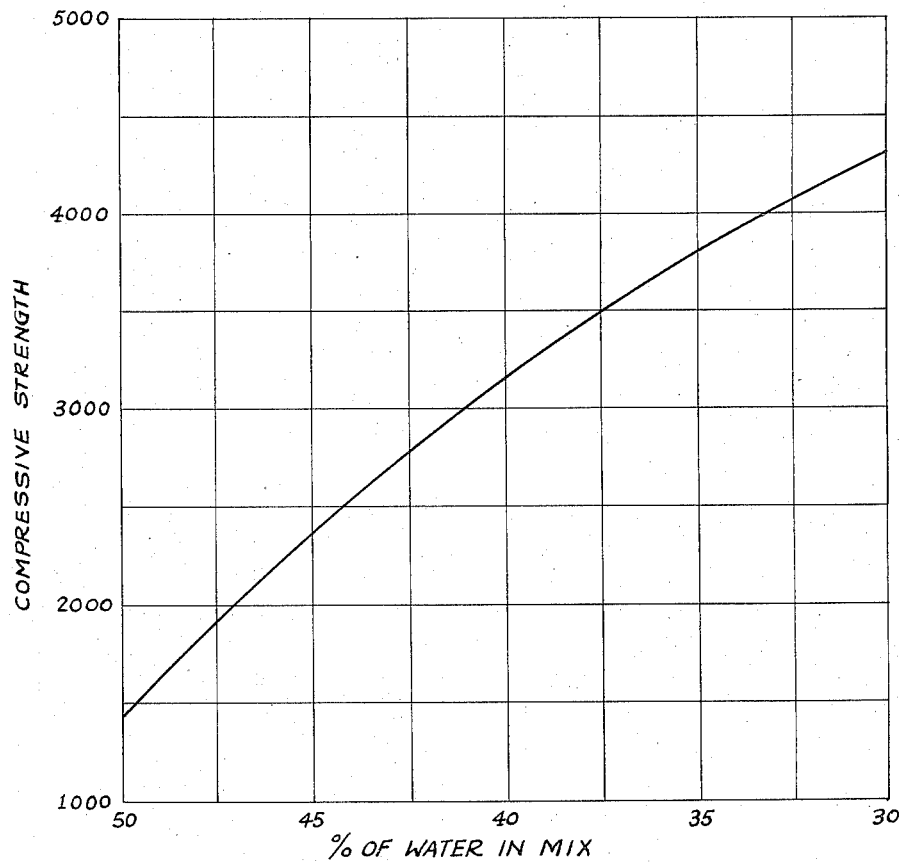
Figure 18:
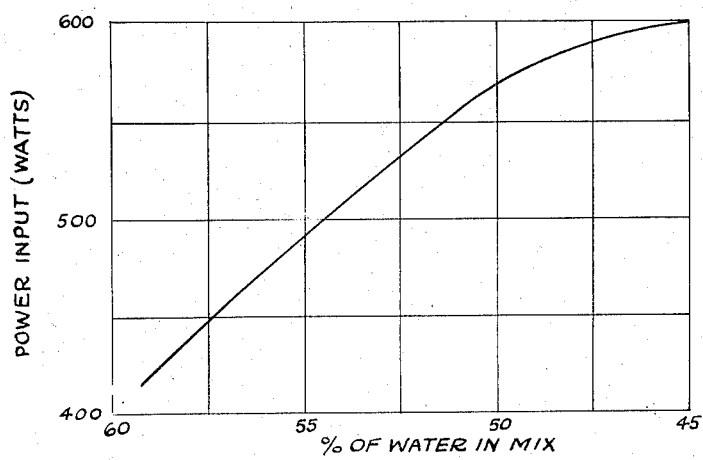

Fig. 4 is a sectional bottom view of the ribbon discharge device taken on line 4—4 of Fig. 1, Fig. 5 is a sectional elevation showing the plaster sprinkling device and taken on line 5—5 of Fig. 1, Fig. 6 is a sectional elevation showing the cooling and delivery end of the gypsum board machine, Fig. 7 is a sectional elevation through the board cooling rolls taken on line 7—7 of Fig. 6, Fig. 8 is an elevation of a modified form of cooling chamber for cooling the board by the use of a current of air, Fig. 9 is a sectional elevation through a modified form of kiln mill for grinding, calcining and feeding hot calcined gypsum to the mixer, Fig. 10 is a sectional elevation through the feed end of a modified form of board machine, Fig. 11 is a transverse sectional elevation through the modified machine taken on line 11—11 of Fig. 10, Fig. 12 is a transverse sectional elevation through the modified machine taken on line 12—12 of Fig. 10, Fig. 13 is a fragmentary transverse sectional view of a building board made through the use of my machine, Figs. 14, 15 and 16 are fragmentary sectional elevations through modified forms of building boards which may be made through the use of modified forms of the machine, Fig. 17 is a graphical chart showing the compressive strengths of low-water gypsum casts as the percentage of water varies, and Fig. 18 is a graphical chart showing the electrical power input into the mixer motor as the percentage of water in the mix varies.

Referring to the drawings by numerals, a mixture of hot calcined gypsum and paper or wood fibers is conveyed from a source of supply by a screw conveyor 20 which operates in an elongated housing 21 which is provided with suitable heat insulation 22 to converse the heat of the calcined gypsum. The hot calcined gypsum may be taken directly from a kettle calciner, a hot pit or a kiln mill to be subsequently described. The calcined gypsum falls from the housing 21 through a chute 23 and hopper cover 24 into a hopper 25 which tapers downwardly to a restricted neck 26. A feeder shaft 27 is rotatably mounted in the neck 26 and carries a multiple blade star feeder 28 which is arranged to deliver the calcined gypsum in measured amounts into an elongated, tubular conveyor housing 29 to which the lower end of neck 26 is connected. A sprocket wheel 30 is secured to one end of the shaft 27 and a chain 31 connects the sprocket 30 to a sprocket wheel 32 which is mounted on the shaft 33 of a variable speed reducer 34 which is driven by a motor 35.

A shaft 37 extends through the tube 29 and is journaled at each end in bearings 38 and 39. A sprocket wheel 40 at one end of shaft 37 is connected by a chain 41 to a sprocket wheel 42 on a mixer motor 43. A ribbon mixer and conveyor 44 of a diameter only slightly less than the inside diameter of the tube 29 is secured to the forward end of shaft 37 by arms 45. A ribbon 46 of smaller diameter than and of opposite hand to the ribbon 44 is secured to the shaft 37 by arms 47. The ribbons 44 and 46, being opposite in hand, a thorough mixing action is obtained, although the movement of material is rearwardly due to the larger diameter of ribbon 46. A solid flight screw 48 is secured to the rear end of shaft 37 to give the mortar or slurry a positive rearward movement under pressure to accomplish an extrusion of the mortar in ribbon form as will be more fully described. Hot water is admitted to the mixer tube 29 through a pipe 50 which is connected to said tube 29 adjacent the neck 26. A needle valve 51 is provided on the pipe 50 to control the flow of hot water to the mixer tube 29 and said pipe 50 is provided with insulation 52 to conserve heat and keep the mixing water hot. Insulation 53 is also provided around the tube 29 to keep the mortar hot and prevent its setting up in the mixer.

By the use of hot calcined gypsum and hot mixing water, the temperature of the mortar can ordinarily be maintained above the critical setting temperature of 140° F. without the use of additional heat. However if it is desired to use additional heat, as in warming up the apparatus in starting, I provide a steam pipe 55 which is connected to the forward end of mixer tube 29 and is provided with a control valve 56. A compressed air pipe 57 is also connected to the pipe 55 so that air can be introduced into the mixer tube 29, either alone or mixed with steam as desired. The compressed air supplies non-condensable gases which are beaten into the mortar by the ribbons 44 and 46 to form air bubbles and reduce the density of the resulting cast. In order to further lower the density of the cast, I provide a foam cell 58 of standard design, which forms a stable foam by whipping a foam solution containing soap bark, starch or other foaming agents with air. This foam flows through a duct 59 which is connected at its lower end with the forward end of the mixer tube 29. In order to still further reduce the density of the resulting cast, I may mix a light weight aggregate, such as vermiculite, pumice, puffed slag, etc. with the calcined gypsum introduced into the hopper 25 by the screw conveyor 20.

It is desired to extrude the thick mix or mortar from the mixer tube 29 as a ribbon 61 which is approximately the thickness of the board or slab to be produced. For this purpose, a housing 62 is provided with an annular flange 63 which is secured by bolts 64 to an annular flange 65 formed on the rearward end of mixer tube 29. Transversely extending wings 67 are formed on the housing 62, said wings being semi-circular in form to loosely fit a screw conveyor having a left-hand screw flight 68 on one end, and a right-hand screw flight 69 on the other end. The screw flights 68 and 69 are secured to a shaft 70 which is journaled at each end in bearings 71 and 72. A bevel gear 73 is secured to one end of the shaft 70, said gear meshing with a bevel gear 74 secured to a counter shaft 75 which is rotatably mounted in bearings 76 and 77. A sprocket wheel 78 is secured to one end of shaft 75 and is connected by a chain 79 to a sprocket wheel 80 secured to the rear end of shaft 37. Outstanding spaced flanges 81 and 82 are formed on the housing 62 and wings 67, said flanges having a transverse slot 83 therebetween. A plurality of orifice plates 84 and 85 are secured to each of the flanges 81 and 82 by bolts 87 which extend through slots 88 formed in said plates 84 and 85. By loosening the bolts 87 the plates 84 and 85 may be moved toward or away from each other to vary the width of an orifice slot 89 between said plates 84 and 85. The inner edges of plates 85 may be provided with serrated teeth 90 which will mold longitudinal ridges or corrugations 91 on the upper surface of the ribbon 61 for a purpose to be described. If desired, the edges of plates 84 may be also serrated to corrugate both surfaces of ribbon 61. The screw conveyor flights 68 and 69 move the mortar outwardly from the central mixer tube 29 and deliver the mortar as a wide ribbon the width of the wallboard to be produced. In the manufacture of plaster boards, it is customary to form three parallel streams of the board at one time. I therefore provide a pair of slides 93 and 94 mounted in slideways 95 and 96 respectively. When plaster board instead of wallboard is to be formed, these slides 93 and 94 are moved inwardly to close off part of the orifice slot 89 between lines of board so that three narrow parallel ribbons will be formed instead of one wide ribbon.

The ribbon 61 is deposited on a moving strip of paper 98 which continuously unwinds from a roll of paper 99 which is rotatably supported on a shaft 100. This strip of paper passes through edge heaters 101, tensioning devices 102, scoring devices 103 and edge folding devices 104 in a manner well known in the art. The ribbon may contain mixing water constituting 25% to 60% of the calcined gypsum, depending on the character of the board or slab to be produced, instead of 80% of water which is ordinarily used. In order to reduce or completely eliminate the amount of free moisture to be removed from the board by an expensive drying process, I provide a device for sprinkling calcined gypsum on the upper corrugated surface 91 of the ribbon 61 to absorb free moisture from the ribbon by chemical union. This calcined gypsum is preferably of the soluble anhydrite or second settle type as it will absorb more moisture chemically than hemihydrate, but the latter may be used. This calcined gypsum is preferably mixed with 2% to 15% of powdered farinaceous paste to act as a bonding agent with a top paper cover sheet 106.

The sprinkling device consists of a screw conveyor 108 which conveys a mixture of calcined gypsum and paste from a bin or other source of supply and delivers the mixture to an elongated hopper 109. A feeder roll 110 is rotatably mounted in the lower end of hopper 109 and has radial narrow ribs 111 around its periphery which closely contact annular flanges 112 and 113 formed on the bottom of hopper 109, said ribs serving to sprinkle a measured quantity of the gypsum paste mixture onto the corrugated surface 91 of ribbon 61. A rotary brush 113 idles freely against the roll 110 to insure a complete discharge of the powdered material. As the top paper cover strip 106 passes around a master roll 114, said strip 106 contacts against the corrugated and plaster sprinkled surface 91 with a pressure which flattens out said corrugations and tends to embed the dry plaster into the body of the mortar material forming the board core where where it absorbs free moisture from the board core by chemical union.

It is desirable to accurately measure the quantity of hot mixing water passing into the mixer tube 29 through pipe 50. I have found (Fig. 18) that the viscosity of the mortar being mixed rapidly changes as the quantity of mixing water is varied. As the viscosity of the mix varies, the electrical power input into the mixer motor 43 will vary as shown in the graph where power input in watts is plotted against percentage of water in the mixture. I therefore put a wattmeter or ammeter 115 in the electrical supply line 116 leading to motor 43 so that the operator can vary the adjustment of needle valve 51 by the reading of the wattmeter 115, thus maintaining a uniform water content in the mixer tube 29. In fact the wattmeter 115 may be calibrated in percentage of water in the mix. The roll 110 is mounted on a shaft 118 and a sprocket wheel 119 is secured to the end of shaft 118 being connected by a chain 120 to a sprocket wheel 121 on the end of shaft 70. By varying the size of sprocket wheels 119 and 121, the speed of rotation of roll 110 may be varied to deliver the correct amount of calcined gypsum onto the corrugated surface 91 and thus absorb the desired amount of free moisture from the ribbon of mortar 61. The application of too much calcined gypsum by the roll 110 must be avoided or the bond of the core with the top cover sheet 106 will be weakened as insufficient moisture will be present to properly wet the calcined gypsum added by roll 110.

Just before the board stream contacts the master roll 114, the paper folding devices 104 fold the edges of the bottom cover sheet 98 about the edges of the core ribbon 61. Farinaceous adhesive is applied to the edges of the top cover sheet by paste nozzles 123 and the top and bottom cover sheets are brought together at their edges by master roll 114. Pressure rolls 124 and 125 may be used after the master roll 114 and edge forming devices 126 and 127 of standard design may be used on each side of the rolls 124 and 125 to form a board edge of the desired shape. A belt 128 passes around pulleys 129 and 130 under the edge forming devices 126 and 127 to support the formed board.

The formed board is now subjected to a cooling action (Fig. 6) to cool it below the critical setting temperature of 140° F. by removing sensible heat and exothermic heat of setting of ribbon 61. This may be accomplished by means of water cooled rolls 130 and 131 above and below the board respectively. Cooling water is conducted from a header 132 to each series of rolls in countercurrent flow to the direction of movement of the board stream 133. Connections 134 of standard design introduce the cooling water through center of the hollow shaft of each roll and return the heated water through the outside of each shaft. Connections 135 connect the rolls in series. The hot water from the two series of rolls combines into the pipe 50 to be used for mixing water. Excess water not needed for mixing flows out to waste through a pipe 136 connected to pipe 50 and having a definite pressure head. If desired, an elongated air chamber 138 may surround the board stream 133 and a blower 139 may draw air through a duct 140 and the chamber 138 to cool and set the board stream 133.

After the board has partially or completely set, it may be punched with holes by a punch 139a of standard design, if a perforated plaster board is to be produced. Individual boards are then cut from the board stream 133 by a cutting knife 140a of standard design. After the boards have been cut to length, they may still contain some free moisture and may be passed through a tunnel drier (not shown) before shipment. However for most purposes, the boards will be dry enough for shipment without the use of artificial drying due to the combination of devices which I have previously described.

When standard kettle calcined gypsum composed mostly of hemihydrate is used for the mortar mixture, it will also be desirable to use accelerator in the mixture delivered by conveyor 20 to cause a setting of the board stream 133 promptly after cooling below the critical temperature of 140° F. However I may use a kiln mill 142 (Fig. 9) for producing a quick setting calcined gypsum by the simultaneous action of grinding and calcination in a manner known to the art. The kiln mill 142 is connected to a cyclone collector 143 which delivers the quick setting calcined gypsum directly to the mixer hopper 25. When using this quick setting calcined gypsum for the mortar mix, no accelerator will be needed as setting will take place immediately upon cooling below the critical setting temperature of 140° F. The calcined gypsum may also be produced by suspension of powdered gypsum rock in hot gases in which case a quick setting calcined gypsum will be produced. The term "quick-setting" in the present connection is used in this art to designate calcined gypsum containing a high percentage of quick-setting soluble anhydrite ($CaSO_4$) as distinguished from the slower setting hemihydrate ($CaSO_4.1/2\ H_2O$) which is the usual result of kettle calcination.

I have found that when a water percentage of less than 53% is used, the foam used in the mortar mix tends to break down and the resulting cast is too dense for some purposes. In such a case, I prefer to mechanically form voids in the plastic ribbon 61 (Fig. 10). After the corrugated surface 91 is subjected to sprinkling with calcined gypsum as before described, it is rolled flat with a heated roll 145 which is heated internally by an electrical heating element 146. The surface of the roll 145 is kept clean by a wiper roll 147 rotated in the same direction as roll 145 by suitable driving mechanism 148. A lower roll 149 below the board stream 133 acts to produce the desired pressure. The flattened ribbon 61 is then punctured at close intervals with a roll 151 having spikes 152 formed about its periphery. The roll 151 is heated internally by an electrical heating element 153 so that the mortar will not set on the spikes 152. A lower roll 154 below the spiked roll 151 produces the desired pressure. The cover sheet 106 is then applied and the board cooled and finished in the manner previously described. The board produced (Fig. 14) will have internal voids 156 closed at the top by the pressure of the master roll 114.

A roll 158 having peripheral spikes 159 may be used after the master roll 114 to puncture the top cover sheet 106 and produce openings 160 (Fig. 15) in the front face of the board for the purpose of producing a plaster board having keys for a layer of plaster applied to the board after erection in a partition or wall. If desired a plaster board may be produced as illustrated in Fig. 16 in which no top cover sheet is used and the corrugated surface formed by the serrated orifice edge 90 is left exposed to give a better bond for a layer of plaster applied after erection by troweling. In Fig 13 is illustrated the type of standard board produced ordinarily through the use of my apparatus.

The board produced as above described requires little or no drying and is therefore economical to manufacture. Another advantage of great importance is that the resulting cast is much stronger and harder than casts produced with a large percentage of water. In Fig. 17 I illustrate graphically the compressive strength increase in the cast as the water content of the mix varies from 30% to 50%. When using ordinary kettle calcined gypsum, a moisture content in the mix used for the core of gypsum boards may be held in the range of 40% to 60%. When low consistency calcined gypsum is used, such as that produced by calcining lump gypsum rock under a steam pressure of about 15 lbs. per sq. in. for 5 to 7 hours, drying and grinding, a water content in the mix of 30% may be used and still have the mortar readily spreadable as a ribbon. A water content of 25% in the mix will usually require some rolling or tamping to secure a proper consolidation of the damp mix. For the purpose of this consolidation, one or more corrugated and heated metal rollers may be used. When imperfect consolidation is obtained, the mass will be porous and reasonably low in density by reason of said imperfect consolidation. On board mixes containing very low percentages of water, it will be desirable to use a liquid adhesive on the faces of the cover sheets adjacent the core so as to insure a perfect bond of the cover sheets with the core. The imperfect consolidation of the damp mix may be used to advantage in preparing acoustical tiles having a high sound absorbing capacity due to the porosity.

I would state in conclusion that while the examples illustrated constitute practical embodiments of my invention, I do not wish to limit myself precisely to these details since manifestly the same may be considerably varied without departing from the spirit of the invention as defined in the appended claims.

Having thus described my invention, I claim as new and desire to secure by Letters Patent:

1. The method of preparing gypsum casts, which comprises mixing calcined gypsum with 25% to 60% by weight of water to form a plastic mass, shaping said mass to the desired form, and incorporating a sufficient quantity of dry powdered calcined gypsum with at least part of said mass to withdraw a substantial portion of free water from said mass and to permit the entire mass to set to a solid cast with little or no free moisture.

2. The method of preparing gypsum casts, which comprises mixing calcined gypsum with 25% to 60% by weight of water to form a plastic mass, shaping said mass to the desired form, incorporating a sufficient quantity of a mixture of dry calcined gypsum and a dry farinaceous adhesive with a surface of said form to withdraw a substantial quantity of free moisture from said mass, applying a fibrous sheet to said surface, and permitting said mass to set to a solid cast having little or no free moisture.

3. The method of preparing gypsum casts, which comprises mixing calcined gypsum with 25% to 60% by weight of water to form a plastic mass, while maintaining the temperature of the mix above 140° F., shaping said mass to the desired form, incorporating a sufficient quantity of a mixture of dry calcined gypsum and dry farinaceous adhesive with a surface of said form to withdraw a substantial quantity of free moisture from said mass, applying a fibrous sheet to said surface, and cooling said form to produce a cast having little or no free moisture.

4. The method of preparing gypsum casts, which comprises preparing a mixture of calcined gypsum and 25% to 60% by weight of water at a temperature in excess of 140° F., forming said mixture into the desired shape, and cooling said mixture to remove therefrom both sensible heat and the heat of setting by the indirect application of cooling water thereto so as to cause said gypsum to set to solid form.

5. The method of preparing gypsum casts, which comprises preparing a mixture of heated calcined gypsum with a low percentage of heated water so as to produce a mixture having a temperature in excess of 140° F., forming said mixture into ribbon form, and cooling said ribbon to cause said calcined gypsum to set to a solid slab.

6. The method of preparing gypsum casts, which comprises mixing calcined gypsum with 25% to 60% by weight of water to form a plastic mass while maintaining said mass at a temperature above 140° F., shaping said mass to the desired form, incorporating a sufficient quantity of a mixture of dry calcined gypsum and dry farinaceous adhesive with a surface of said form to withdraw a substantial quantity of free moisture from said mass, applying a fibrous sheet to said surface, and subjecting said surface to a repeated rolling and cooling action so as to create a bond between said sheet and said surface, and so as to cause said form to cool and set to a solid cast.

7. The method of preparing gypsum casts, which comprises continuously conveying heated calcined gypsum and continuously mixing said gypsum with 25% to 60% by weight of heated water, continuously introducing foam into said mixture, forming said mixture into the desired shape, and cooling said mixture to form a rigid cast.

8. The method of preparing gypsum boards, which comprises continuously introducing a plastic mixture of calcined gypsum and 25% to 60% by weight of water between moving paper cover sheets, said mixture being maintained at a temperature above 140° F. during said mixing, and cooling said board to accomplish the setting of said mixture.

9. The method of preparing gypsum boards, which comprises continuously extruding a warm plastic mixture of calcined gypsum and 25% to 60% by weight of water from a slotted orifice having a serrated edge so as to produce a continuous ribbon of mortar having a corrugated upper surface, continuously applying a sufficient quantity of dry calcined gypsum substantially to fill said corrugations, embedding the thus applied gypsum into the ribbon and applying a continuous fibrous sheet thereto, rolling said sheet into firm contact with said ribbon, and cooling the composite gypsum board thus produced to induce the setting thereof to a board having little or no free moisture.

10. In a gypsum board machine, means for continuously advancing a pair of spaced strips of paper, means for introducing a warm core mixture of calcined gypsum and a low percentage of water between said strips, and means for positively and quickly cooling said board to induce setting of said core to solid form.

11. In a gypsum board machine, mixing means for producing a warm plastic ribbon of calcined gypsum and 25% to 60% water, means for depositing a thin layer of calcined gypsum on at least one surface of said ribbon, means for enclosing said ribbon in fibrous cover sheets, and means for positively and quickly cooling the composite material to form a finished gypsum board having a low percentage of free moisture.

12. In a gypsum board machine, mixing means for producing a warm ribbon of calcined gypsum and 25% to 60% water, said ribbon having at least one surface thereof corrugated, means for depositing a thin layer of calcined gypsum on said corrugated surface, roll means for applying a fibrous cover sheet on said corrugated surface to flatten said corrugated surface and form a firm bond with said fibrous sheet, and means to bring a cooling body in heat exchange relation with the composite material to form a rigid gypsum board having a low percentage of free moisture.

13. In a gypsum board machine, mixing means for producing a warm ribbon of calcined gypsum and a low percentage of water, means for enclosing said ribbon in fibrous cover sheets, and a series of water cooled rolls engaging the surfaces of the composite material to cool said material and form a set rigid gypsum board.

14. In a gypsum forming machine, mixing means for continuously producing a plurality of warm parallel ribbons of calcined gypsum and 25% to 60% water, and means for positively and quickly cooling said ribbons to form rigid slabs of set gypsum.

LEWIS A. PALEY.

CERTIFICATE OF CORRECTION.

Patent No. 2,366,673.　　　　　　　　　　　　　　　　January 2, 1945.

LEWIS A. PALEY.

It is hereby certified that error appears in the printed specification of the above numbered patent requiring correction as follows: Page 2, first column, line 51, for "converse" read --conserve--; page 3, first column, line 69, strike out the word "where"; page 5, second column, line 50, after the word and period "gypsum." insert the following as claim 15 -

> --15. In a gypsum board machine, mixing means for producing a warm ribbon of calcined gypsum and 25% to 60% water, means for enclosing said ribbon in fibrous cover sheets, a heat exchange surface having one face disposed for contact with the composite material, means to supply cooling water to the other face of the heat exchange surface, and means for utilizing the warmed cooling water for mixing with additional quantities of calcined gypsum. -- ;

and that the said Letters Patent should be read with this correction therein that the same may conform to the record of the case in the Patent Office.

Signed and sealed this 15th day of May, A. D. 1945.

(Seal)　　　　　　　　　　　　　　　　Leslie Frazer
　　　　　　　　　　　　　　　　Acting Commissioner of Patents.